UNITED STATES PATENT OFFICE.

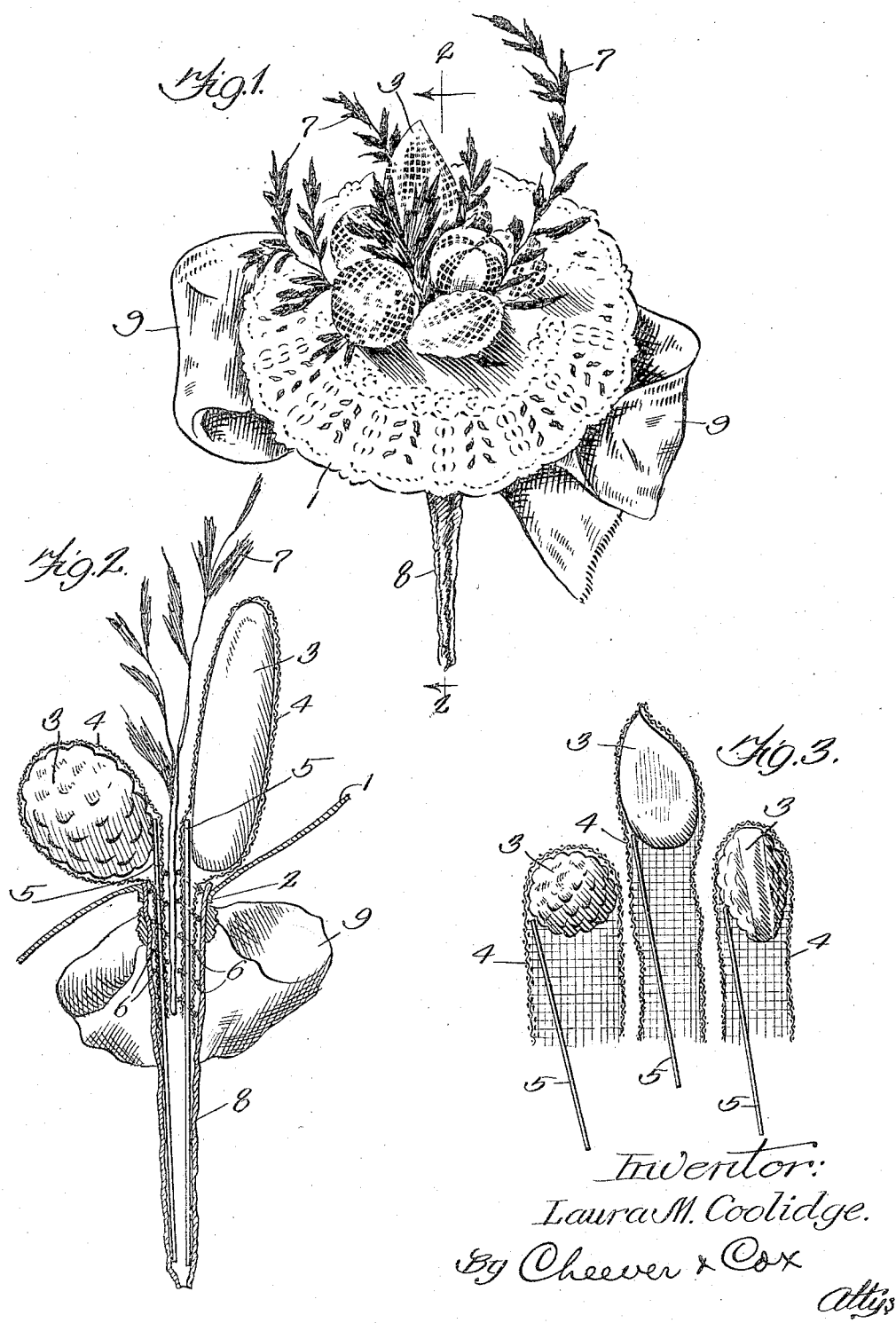

LAURA M. COOLIDGE, OF CHICAGO, ILLINOIS, ASSIGNOR TO BUNTE BROTHERS, OF CHICAGO, ILLINOIS, A CORPORATION OF ILLINOIS.

CANDY-CONTAINER.

1,238,110.   Specification of Letters Patent.   Patented Aug. 28, 1917.

Application filed January 2, 1917. Serial No. 140,079.

*To all whom it may concern:*

Be it known that I, LAURA M. COOLIDGE, a citizen of the United States, residing at Chicago, in the county of Cook and State of Illinois, have invented a certain new and useful Improvement in Candy-Containers, of which the following is a specification.

My invention relates to facsimile bouquets or candy containers simulating formal bouquets or boutonnières, suitable for cotillion favors and as novelties for dinners and festival occasions, and the object is to produce an article of this character composed chiefly of candy, which may be eaten after the article has served its purpose as a favor or novelty.

I accomplish my object by the construction illustrated in the accompanying drawing, in which:

Figure 1 is a perspective of the complete article.

Fig. 2 is a vertical section taken on the line 2—2, Fig. 1, and

Fig. 3 is a fragmentary view, partly in section, illustrating part of the method of manufacture.

In the form shown in the drawings, I provide a base or backing 1, preferably of white embossed or perforated paper having an aperture 2 at the center. Above this I arrange a plurality of pieces 3, 3 of candy. To produce the best effect, it is desirable to employ candies of various shapes and colors simulating fruits and nuts. To illustrate, an attractive bouquet will be produced by using pieces of the color and shape of the following: a red raspberry, an almond, a strawberry, a peanut, a cherry and a hazelnut. The candies are preferably hard and may or may not be filled with a jam or paste formed from the article which the piece is intended to represent.

The individual pieces are held in place by gauze 4, as best shown in Figs. 2 and 3. For the purposes of the patent drawing, it has been necessary to show this gauze as readily apparent, but in the manufactured article, I employ a gauze which is inconspicuous and, in fact, practically invisible when the article is held at arm's length. For this purpose I prefer to employ tulle, silk net or similar fabric which, for convenience, may be referred to as "gauze". According to the preferred method of construction, I take a piece of candy and lay against the lower end of it the upper end of a small splint 5 of wood. A common, cut toothpick will serve the purpose. I then throw a small sheet of the gauze over the top of the piece of candy and draw the flowing ends down around the splint. I then apply a filament 6 of fine wire or thread to bind the ends of the fabric to the splint. By this means, the splint acts as a stem for the individual piece of candy, and holds it more or less erect after the manner of a flower on its stem. After I have treated all the pieces of candy in this way, I gather the stems together in a bunch, interspersed preferably with sprigs 7 of foliage, which preferably are green in color. I then wrap this bunch of stems with a filament of wire or thread in a similar manner and thus obtain a stem for the bouquet. I then pass this stem down through the central aperture in the backing 1, after which it is desirable to apply tin foil 8, tied preferably with a ribbon 9 just beneath the base. The ribbon is preferably of some stiff gauze-like fabric and may be of yellow or blue or some other color which would contrast well with the other parts of the bouquet.

When the article is completed it presents a striking imitation of a bouquet of flowers. The effect is best produced by making the article about the size of a boutonnière. The different colored candies form a pleasing contrast to the green of the sprigs and to the white of the base and to the color of the ribbon beneath. The gauze is inconspicuous and yet it holds the pieces of candy in such manner that they all stand out individually as if they were flowers grouped together. After the article has served its purpose to entertain the diners, dancers or other guests, it may be taken apart and the candies eaten. The device therefore performs the function of a candy container. The candies are securely held by the gauze and therefore do not need to be handled, the stem affording means for holding the article or securing it to the coat or dress of the recipient. When in such position, the backing 1 protects the candy from contact with anything which might render it less available for its purposes.

With my construction it is possible to employ hard candies filled with liquid or semi-liquid contents, for it is not necessary to puncture the candy to hold it in position, nor is there any danger of the candy becoming loose, for the gauze, although very thin, adapts itself to the shape of the different pieces so that a firm and gentle pressure is exerted on the outer surface of the candy; hence, there is practically no danger of the pieces becoming loose or cracking.

It will be understood that it is not essential that each and every one of the elements of the bouquet as shown be present in each instance of manufacture; for example, the ribbon 8 may be omitted and even the sprigs 5 may be omitted without totally destroying the illusion. While I prefer to employ an individual sheet of gauze for each individual piece of candy, it would be possible to obtain a somewhat similar effect by using one large sheet for the purpose and forming pockets in it for holding the individual pieces of candy, the flowing portions being bunched together in the manner stated. The base or backing 1 might also be omitted, although, of course, to the detriment of the device as a whole. I therefore wish to have the invention interpreted in the spirit of the following claims.

Having thus described my invention, what I claim as new and desire to secure by Letters Patent, is:

1. As an article of manufacture, an imitation bouquet comprising a plurality of pieces of candy, and an inconspicuous envelop over each individual piece, the flowing, depending portions of the envelop being bunched together and fastened to form a stem, whereby the pieces of candy stand out as individual elements and have a limited individual movement and yet form part of an integral whole and exhibit their true individual shapes and colors.

2. An article of the class described comprising a plurality of pieces of candy, gauze covering each piece individually, the ends of the gauze being brought down and wrapped with a filament to form a stem, and a base or backing surrounding the stem beneath the candy.

3. An imitation bouquet comprising a plurality of pieces of candy, a splint adjacent to each and a gauze over each piece for holding it to its splint, the splints and adjacent gauze forming the stem of the bouquet.

4. An article of the class described comprising a plurality of pieces of candy of different colors, a splint adjacent to each, a gauze over each piece and surrounding the splint to form a stem for the piece, sprigs of foliage interspersed with each stem, and a filament wrapped around the stems and gauze to form a stem for the bouquet as a whole.

5. An imitation bouquet consisting of a flexible base, a plurality of pieces of hard candies of various shapes and colors, sprigs of foliage, a gauze envelop inclosing the different pieces of candy, means upholding the candies in vertical position, said gauze and said upholding means being gathered at the heart of the bouquet and being there fastened to the stems of the sprigs.

6. An article of manufacture comprising a plurality of non-punctured pieces of candy, inconspicuous gauze around each individual piece, and a base having an aperture approximately in the center, the gauze being gathered at the center of the bouquet and passing down through said aperture and being bundled together beneath said base to form a stem for the bouquet.

7. An article of manufacture comprising a plurality of individual candies of various shapes and colors, a flexible base or backing having a hole approximately in the center, inconspicuous woven fabric around the individual candies, the fabric being gathered beneath the candies, means inside the fabric and in contact with the candies for holding them upright, sprigs of foliage interspersed between the candies and extending down into the heart of the bouquet and a filament for wrapping the gathered portion of the fabric and the parts in contact therewith.

8. An imitation bouquet comprising a plurality of candies, a gauze around the individual pieces of candy, said gauze being gathered together to form a nucleus of a stem, sprigs of foliage extending down into the stem, a backing through which the stem penetrates, and means for securing the backing in position upon the stem.

In witness whereof, I have hereunto subscribed my name.

LAURA M. COOLIDGE.

Copies of this patent may be obtained for five cents each, by addressing the "Commissioner of Patents, Washington, D. C."